United States Patent Office 3,250,785
Patented May 10, 1966

3,250,785
PREPARATION OF CARBOXYLIC ACIDS FROM SOLVENT EXTRACTS
Louis A. Joo, Johnson City, Tenn., assignor, by mesne assignments, to Union Oil Company of California, Los Angeles, Calif., a corporation of California
No Drawing. Filed Dec. 21, 1962, Ser. No. 246,335
14 Claims. (Cl. 260—327)

This invention relates to a method of fractionating complex acid mixtures derived from sulfur-containing aromatic compounds of petroleum origin and to the fractions so obtained. More particularly, this invention relates to a method of dividing mixed complex carboxylic acids, derived from sulfur-containing aromatic compounds, such as solvent extracts obtained in the solvent extraction of mineral lubricating oils using a solvent selective for aromatic compounds hydrogenated solvent extracts and FCC recycle stock, decant oil from FCC processes, and mixtures of these starting materials, into fractions of reduced complexity.

This invention is based on the discovery that complex carboxylic acids prepared from solvent extracts by metallation, carbonation and acidification are divided into fractions of reduced complexity and different acid number by (1) dissolving the Group I metal salts of the acids to be fractionated in a solvent in which the Group II and other metal salts thereof are at most only sparingly soluble, (2) adding a small amount of a water-soluble salt of a Group II or other metal to the Group I metal salt solution, while heating and stirring the mixture, (3) cooling and filtering the resultant mixture to recover a first fraction, (4) adding another small amount of a water-soluble Group II metal compound to the resulting filtrate, and heating, cooling and filtering the resulting mixture, (5) continuing this cyclic precipitation until the solvent phase is substantially free of the desired acid salts (6) (a) acidifying the separate precipitates with an acid sufficiently strong to decompose the salt and liberate the desired free acids, (b) extracting the free acids so produced with a solvent in which they are soluble, (c) water-washing the solvent-acid phase, and (d) stripping the solvent from the acid fractions.

Since the individual acid fractions of the acid mixture find separate utilities in the preparation of derivatives, such as amides, aminoamides, polyesters, polyethers, and the like, it is highly desirable that a method be found which accomplishes these results. To this end the instant invention is directed as applied to a uniquetly complex and useful new class of complex carboxylic acids.

The method of this invention represents an improvement over the methods described in copending applications Serial No. 161,355, filed December 22, 1961; Serial No. 209,741 (now abandoned), filed July 13, 1962; Serial No. 209,780 (now U.S. Patent 3,180,876), filed July 13, 1962; with the exception that it is limited to the complex carboxylic acids derived from sulfur-containing aromatic compounds of petroleum origin while the methods of the aforesaid copending applications can be applied to acid mixtures from other sources. The method of this invention uses a replacement reaction or procedure to separate complex carboxylic acid mixtures where less complex systems or methods such as distillation, extraction crystallization, etc., are ineffective.

Accordingly, it becomes a primary object of this invention to provide a process for separating complex acid mixtures, derived from sulfur-containing aromatic compounds of petroleum origin, into fractions of different acid number.

Another object is to provide new fractions of said acids prepared by the method of this invention.

Still another object is to provide a process of separating mixtures of complex mono-, di- and polycarboxylic acids, derived from solvent extracts, hydrogenated solvent extracts, FCC recycle stocks and FCC decant oil into fractions which are predominantly monocarboxylic and fractions which are predominantly di- and polycarboxylic.

These and other objects of this invention will be described or become apparent as the specification proceeds.

In accordance with this invention, I have found that complex mixtures of acids produced from complex, polynuclear, aromatic and heterocyclic compounds of petroleum origin by metallation, carbonation and acidification can be separated into less complex fractions by replacing the Group I metal ion of the salts with a Group II metal ion or another metal ion such as copper, tin or lead. The cations of the various salts used for the fractionation process of this invention are used most conveniently in a water-soluble-salt form such as the acetate, nitrate, tartrate, citrate, halide and the like. In a more specific aspect of this invention the sodium, potassium, or lithium salts of the acids, which may be the mixed products produced from the carbonation step in the preparation of the acids or which may result from the transformation to the sodium, potassium or lithium salts by reaction of the free acid mixture with an appropriate compound, are dissolved in a solvent in which the Group II metal or other metal salts, such as calcium, barium, or magnesium salts, are insoluble. In the case of the mixed acids prepared from complex polynuclear, heterocyclic compounds obtained in the solvent extraction of mineral lubricating oils, I have found that the most convenient solvent is water. The next step in the process is to add a small amount of the Group II or other metal salt, either in solid form or in the form of an aqueous solution, to the Group I salt solution. This step is aided by stirring and heating the mixture to a temperature of about 70° to 80° C. for about 10 to 15 minutes. The mixture is next cooled to a temperature of about 20 to 50° C. to aid in the formation of the precipitate of the Group II metal salt of a portion of the complex acids. This precipitate is filtered off and washed with water at a temperature of about 0° to 20° C. The filtrate from this step is treated with another small amount of a solvent-soluble Group II or other metal salt such as calcium, barium or magnesium acetate or nitrate and the mixture is again heated, stirred, cooled and filtered.

The foregoing steps are continued to carry out cyclic precipitation until the solvent phase is substantially free of the desired acid salts. The acid salts may be used in the salt form or transformed to free acids by individually acidifying the precipitated fractions with an acid such as sulfuric, nitric, hydrochloric, choloacetic acid and the like having sufficient strength to decompose the salt and liberate the free acids. The free acids so formed may be taken up in a solvent phase in which they are soluble and then treated to water washing and final stripping of the solvent from the acids.

In order to demonstrate the invention the following non-limiting examples are given:

EXAMPLE I

A water solution of the sodium salt of a complex carboxylic acid mixture derived from solvent extracts by metalation and carbonation was prepared contaning 12.6 g. of the salt/100 ml. of water. Another solution containing 25 g. of calcium acetate/75 ml. of water was prepared. Three 40 ml. aliquots of the solution containing the sodium salt of the complex acid mixture were treated with 1, 2 and 4 ml. portions of the calcium acetate solution. The mixtures were heated to 70–80° C., kept at that temperature for 10 to 15 minutes under stirring, and, after the mixture had cooled down they were filtered.

The precipitates were washed with water, the washing water was combined with the filtrate, and the precipitates and filtrates were separately acidified with HCl and extracted with ether. The ether was stripped off, and the remaining free acids were weighed. The results of this procedure are given in the following table:

*Table 1*

[Original extract acid: A.N.: 218; M. Wt.: 420; Percent unsap.: 8.7; —COOH/mole: 1.63 (average)]

| Fraction No. | Ml. Ca-acetate solution used | Precipitate | | | | Filtrate | | | |
|---|---|---|---|---|---|---|---|---|---|
| | | G. | A.N. | Mol. wt. | —COOH/mol. | G. | A.N. | Mol. wt. | —COOH/mol. |
| 1 | 1 | 0.94 | 162 | 405 | 1.2 | 3.69 | 202 | 410 | 1.48 |
| 2 | 2 | 2.35 | 146 | 410 | 1.06 | 2.41 | 242 | 415 | 1.79 |
| 3 | 4 | 3.73 | 157 | 415 | 1.16 | 0.85 | 307 | 415 | 2.27 |

EXAMPLE II

A water solution of the potassium salt of complex carboxylic acids, derived from metallation, carbonation of solvent extracts obtained in the solvent refining of mineral lubricating oils using a solvent selective for aromatic compounds, is treated with a zinc chloride solution by incremental addition and separation of the precipitate of the zinc salt of the acids after each addition. Fractions of zinc salts of the predominantly mono-carboxylic complex acids are recovered in the precipitates. The filtrate contains complex acids which are predominantly dibasic.

EXAMPLE III

Following the procedure in Example I a similar separation is affected using a barium chloride solution in place of the calcium acetate.

EXAMPLE IV

Following the procedure in Example I a water solution of a mixture of complex sodium salts mono-, di-, and polycarboxylic acids prepared by metallation and carbonation of FCC decant oil is separated into predominantly mono-, di- and polycarboxylic acid fractions by sequential treatment with 2, 4 and 6 parts of a water solution of chromium chloride per part of said mixture.

As seen from the examples, the process of this invention is effective using various proportions of the salt solutions with the precipitating salt solution. The first solution of the complex acid Group I metal salt can be prepared in various concentrations ranging from about 1 g./100 ml. of solvent to 25 g./100 ml. of solvent depending somewhat upon the solubility of the Group I metal salts in the particular solvent selected. Likewise, the concentration of the precipitating Group II metal salt can vary from about 10 g./100 ml. of water to 50 g./100 ml. of water. The concentration of the precipitating Group II metal salt is subject to variation and in some instances it may be necessary to use a trial and error method to determine the most effective concentration for use in accordance with this invention. Similarly, the proportions or aliquots of the Group I metal salt solution of the complex acids used or treated with the precipitating Group II or other metal salt solution are subject to variation. Thus the solution of the complex acid Group I metal salt being treated may comprise from 20 to 50 volumes to be treated with 1 to 10 volumes of the precipitating Group II metal salt solution. The temperature at which the mixtures are heated is also subject to variation. In general, this temperature may range from 70° to 150° C. and preferably is about 70–80° C. The precipitation is a function of time and to accomplish completion of the separation, about 10 to 30 minutes are normally required.

The precipitation is enhanced by agitation and stirring along with cooling prior to filtering.

Solvents that can be used to prepare solutions of the Group I metal salt of the complex acids to be fractionated include, but are not limited to, water, low-molecular-weight alcohols, and mixtures of water and low-molecular-weight alcohols. In general, the solvent must be one in which the salts of the complex acids ionize. $C_1$–$C_5$ alkanols can be used.

Group I metal compounds that can be used to prepare the salts from the original mixture of acids prepared by metalation, carbonation and acidification are sodium, potassium, lithium, and cesium, salts such as chromites, bromides, iodides, acetates, nitrates, sulfates, chromates, manganates, chlorates and the like. If the original mixture of salts produced during the carbonation step of the acid preparation is used, all of the acids will be in the form of their sodium, lithium, potassium, or cesium salts. Where the free complex acid mixture is used as the starting material, both single salts and mixtures of salts of Group I metals may be used.

The precipitating or precipitant Group II metal salts include beryllium, magnesium, calcium, zinc, strontium, cadmium and barium salts such as halides, acetates, nitrates, chromates, sulfates and the like. Other precipitating metal salts include salts of lead, tin, iron, cobalt, nickel, germanium, chromium, and copper. The solvent used during the extraction step is one which has at least some solubility for the free acids. Organic solvents of the type of ethers, alcohols, ketones and esters can be used for this purpose. Specific examples of suitable organic solvents include, but are not limited to, diethyl ether, diamyl ether, butanol, isopentanol, n-hexanol, methyl isobutyl ketone, methyl isoamyl ketone butyl acetate, amyl acetate, 2-ethylhexyl acetate, etc. $C_1$ to $C_{12}$ alkanols, ethers and ketones can be used.

THE COMPLEX CARBOXYLIC ACID MIXTURES

The complex carboxylic acids or acid mixtures used in accordance with this invention are prepared in accordance with the processes disclosed in copending applications, Serial No. 819,932, filed June 12, 1959 by T. W. Martinek, now abandoned, Serial No. 79,661, filed December 30, 1960 by W. E. Kramer, now U.S. Patent No. 3,153,087, L. A. Joo and R. W. Haines, and Serial No. 160,882, filed December 20, 1960 by T. W. Martinek.

These acids are further described in related copending applications, Serial No. 79,541, filed December 30, 1960 by W. E. Kramer and L. A. Joo, now U.S. Patent No. 3,154,507 and Serial No. 79,506, filed December 30, 1960 by T. W. Martinek.

In accordance with said copending applications, the complex, polynuclear, aromatic, and alkylaromatic carboxylic acids separated by the method of this invention are derived by metalation, carbonation, and acidification of a source of complex, polynuclear, aromatic sulfur-containing nuclei as represented by (1) solvent extracts obtained in the solvent defining of mineral lubricating oils using a solvent selective for aromatic compounds, (2) hydrogenated and refined solvent extracts, (3) FCC recycle stock and (4) decant oil from FCC processes. The source materials are described in detail in copending application Serial No. 242,076 (450), filed December 4, 1962.

The resulting complex acids, hereinafter referred to as extract acids, or EPA, are mixtures of mono-, di-, and polycarboxylic acids. Through chemical analysis, characterization and study of the physical and chemical properties, it has been determined that they can be represented in part, by way of illustration only, by the following formulae:

Monobasic acids

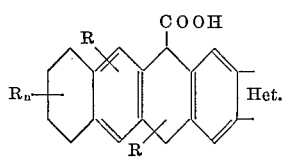

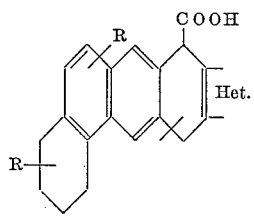

Dibasic acid

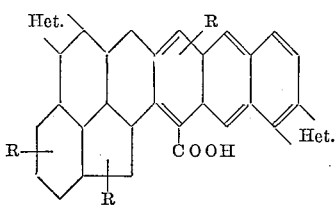

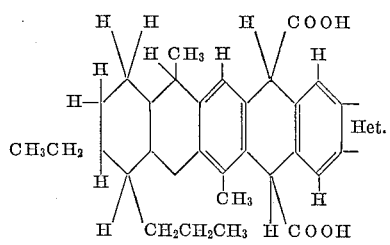

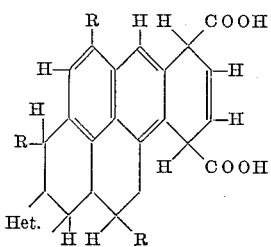

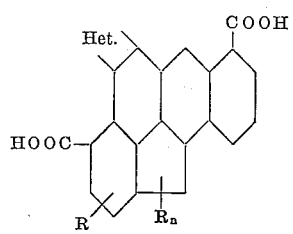

Tribasic acids

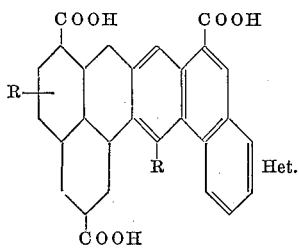

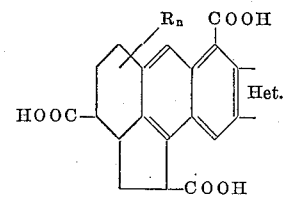

wherein "Het." illustrates one or more S-, N-, or O-containing heterocyclic ring substituents, R is an alkyl or cycloalkyl radical having a total of 5 to 22 carbon atoms for each nucleus, and $n$ has a value of 3 to 10. The molecular weight of the extract acids ranges from about 250 to 750, and the average molecular weight is about 325–470. Table II gives representative physical and chemical properties of the extract mono-, di- and polycarboxylic acids to be used in accordance with this invention.

Table II

| Property: | Value |
|---|---|
| Av. mol. wt. range | 325–470. |
| Melting point | 60–100° C. |
| Bromine number | 4–24. |
| Percent sulfur | 1.05–4.45. |
| Color | Deep red-dark brown. |
| Percent unsaponifiables | 2–8. |

In the mixture of acids produced by metalation, carbonation, and acidification of solvent extracts, the monobasic acid derivatives constitute from 5–95% by weight, the dibasic acids constitute from 5–95% by weight and the polybasic acids, that is, those acids containing from 3 to as high as 7 carboxyl groups, make up from 0 to 20% by weight.

Since the preferred source material for making acids separable by the process of this invention, namely solvent extracts from the manufacture of mineral lubricating oil, does not lend itself to economical production of the desired complex acids using prior art methods, the preferred methods of preparation set forth in said copending applications will be described and the properties of the acids set forth as examples. The details of these processes as described in said copending applications are incorporated herein by reference.

EXAMPLE V

One procedure is to react about 30 parts of a petroleum fraction rich in complex polynuclear aromatics, as exemplified by solvent extract oils, with 1 to 5 parts of an alkali metal, such as sodium, potassium cesium, lithium, and rubidium, and their mixtures and amalgams, at a temperature of about 60° to 80° C. in the presence of a reaction solvent such as dimethyl glycol ether, dimethyl ether, methylalkyl ethers, dialkyl glycol ethers, tetrahydrofuran, methyl ethyl ketone, methylal, dioxane and trimethylamine. The formation of the adduct is promoted by shearing and agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction caused by impurities, including sulfur compounds, present therein which tend to coat the alkali-metal particles and prevent the reaction or prolong the induction period. A Brookfield counter-rotating stirrer may be used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about $-20°$ to $-80°$ C., causing a discharge of the color. This forms the alkali-metal salt of the complex acid which, upon acidification with a mineral acid, such as sulfuric, nitric or hydrochloric acids, yields the desired complex, polynuclear, carboxylic acids in good yields. To illustrate, the following non-limiting examples are given:

EXAMPLE VI

One hundred grams of extract oil No. 19 (Table IV) from the preparation of 170 vis., 100 VI neutral oil, dissolved in 675 cc. of dry tetrahydrofuran, was reacted with agitation at 10° to 30° C. with 8.3 grams of metallic sodium in the form of 3/16" cubes. After 25 minutes, adduct-formation began and a strong color change took place. The product was cooled to $-60°$ C. while an excess of carbon dioxide gas was introduced, resulting in a discharge of the color without precipitation. The 5.1 gms. of unreacted sodium was removed, the tetrahydrofuran was vacuum-stripped therefrom, and the remaining liquid was combined with ether and water-washed. Acidification of the aqueous phase and further ether washing resulted in the recovery of the free acids. About 11% of the solvent extract had reacted. The acid product had an indicated average molecular weight of 686, a saponification value of 171, and a calculated equivalent weight of 328, indicating an average of 2.1 carboxyl groups per molecule.

EXAMPLE VII

One hundred grams of extract oil No. 19 (Table IV) and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained in the flask. Approximately 100 gms. of Alundum balls, 5/16" in diameter, were charged and agitation started. The solution was cooled to $-20°$ C. and 8.3 gms. of sodium as a 20% dispersion in toluene were added. After an induction period of about 5 minutes, the solution was warmed, and at $-7°$ C. the reaction began; in 17 minutes it was proceeding rapidly. An excess of dry carbon dioxide was added at $-80°$ C. over a period of 78 minutes. The reaction mass was worked up as in Example I after the excess sodium was destroyed with water. About 15% of the extract oil reacted, and 22.5 gms. of extract acid were recovered having a saponification value of 241, indicating an equivalent weight of 233. The acid product contained 2.8% sulfur.

EXAMPLE VIII

The process of Example II was repeated producing complex acids having a saponification value of 323, an indicated equivalent weight of 173, an indicated average molecular weight (cryoscopic) of 600, and containing 3.0% sulfur. The ratio of molecular weight to equivalent weight was 3.5 indicating a mixture containing acids with more than two carboxyl groups per molecule on the average.

EXAMPLE IX

The various recovered acids of application Serial No. 819,932, illustrated in Table II therein, are further examples of mono-, di- and polycarboxylic acids to be used to prepare acids separable by the process of this invention.

EXAMPLE X

The various carboxylic acid products described in Runs 12 through 47 of application Serial No. 79,661 are further examples of acids that may be used.

In order to further illustrate the complexity and types of acids that can be separated in accordance with this invention the following tabulation is given:

*Table III.—Typical properties of a number of example complex acids (EPA)*

| No. | Sap. Value | Mol wt. | Percent S | Br. No. | Percent unsap. | Eq. wt. | Eqs./mol | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |
| 101 | | 405 | | | 9.0 | | | 168 |
| 102[1] | | 320 | | | | | | 240 |

[1] This acid was prepared from decant oil: API gravity 15.4°, R.I. 1.5425. Acid No. 102 contained about 1.5 average number of carboxyl groups per molecule.

The starting materials for the reaction to prepare the complex acids to be separated in accordance with this invention may be any complex, polynuclear, and/or heterocyclic aromatic hydrocarbon from petroleum sources. A preferred and unique source of aromatic starting material comprises petroleum fractions as herein defined, not only because the mono-, di-, and polybasic acid products therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed-ring and heterocyclic nuclei forming the organic portion of the mono-, di-, and polybasic carboxylic acids, or their mixtures, processed in accordance with this invention. Solvent extracts from the manufacture of bright stock and neutral lubricating oils are particular examples of such fractions rich in complex aromatic compounds obtained as by-products from the solvent refining of mineral oils.

As stated above, a preferred source of the above-defined complex hydrocarbons comprises the solvent extracts obtained in solvent refining mineral oils, particularly lubricating oil fractions, using a solvent selective for aromatic compounds. These extracts, hereinafter referred to as solvent extracts, are obtained as the extract or solvent phase when lubricating oils are refined by treatment with said selective solvent having an affinity for the aromatic compounds.

Since the general process of refining mineral lubricating oils in which solvent extracts are obtained is well known, and is related in detail in said copending applications, it is only necessary for present purposes to give some examples by way of illustration. Following are the physical characteristics of typical extract products, from lubricating oil stocks derived from various crude oils and other source hydrocarbon materials, which may be used to prepare the acids to be separated by the process of this invention.

Table IV.—Sources and physical characteristics of solvent extracts

| Ext. No. | Crude source | Solvent | API grav. | Sp. gr. at 10° F. | Vis/100° F. | Vis/130° F. | Vis/210° F. | V.I. | Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | ...do | ...do | 15.4 | | 15,000 | | 285 | +39 | | | | | | |
| 3 | ...do | ...do | 12.6 | | 36,410 | 4,310 | 310.1 | −1 | +80 | | | | 4.7 | 2.27 |
| 4 | ...do | ...do | 14.6 | | 19,500 | 4,305 | 313 | +27 | +90 | | | | 4.7 | 2.2 |
| 5 | ...do | ...do | 15.4 | | 32,500 | | 372 | +5 | +60 | | | | 4.13 | 2.33 |
| 6 | ...do | ...do | 13.7 | | 25,000 | 5,400 | 355 | +27 | +80 | | | | | 2.18 |
| 7 | ...do | ...do | 8.6 | | 145,000 | 19,000 | 616 | 0 | +70 | | | | | |
| 8 | ...do | ...do | 10.5 | | 12,676 | 2,514 | 172.1 | −101 | +60 | | | | | 2.18 |
| 9 | Santa Fe Springs | ...do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | ...do | Phenol | 13.6 | | | | 41.7 | −82 | +20 | | | | | |
| 15 | ...do | Chlorex | 13.6 | | | | 200 | −61 | +75 | | | | | |
| 16 | ...do | Phenol | 8.9 | | | | 569 | | +75 | | | | | |
| 17 | ...do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | ...do | ...do | 11.1 | | | | 61.5 | −56 | +40 | 435 | 475 | | 0.42 | 2.7 |
| 20 | ...do | ...do | 13.7 | | | | 360 | +25 | +65 | 550 | 630 | | 5.5 | 2.3 |
| 21 | ...do | ...do | 7.7 | | | | 71.1 | −128 | +35 | 420 | 495 | | 0.86 | 3.2 |
| 22 | ...do | ...do | 7.3 | | | | 796 | −76 | +65 | 520 | 610 | | 7.7 | 3.0 |
| 41 | ...do | ...do | 17.6 | | 154 | 80 | 41 | 11 | +30 | 400 | 435 | | 0.1 | 2.0 |
| 42 | ...do | ...do | 13.7 | | 26,000 | 5,615 | 360 | +25 | +65 | 550 | 630 | 37.5 | 5.5 | 2.3 |
| 43 | ...do | ...do | 11.1 | | 1,054 | 331 | 61.5 | −56 | +40 | 435 | 475 | 40.0 | 0.4 | 2.7 |
| 44 | ...do | ...do | 7.7 | | 2,007 | 611 | 71.1 | −128 | +35 | 420 | 495 | 38.6 | 0.86 | 3.2 |
| 45 | ...do | ...do | 7.3 | 1.019 | 230,000 | 20,800 | 796 | −76 | +65 | 520 | 610 | | 7.7 | 3.0 |

Extract No. 41 was obtained in the production of 85 Vis neutral, has an average molecular weight of 300, and contained 76.8% aromatics (by the silica gel procedure).

Extract No. 42 was obtained in the production of 150 Vis Bright Stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis neutral, has an average molecular weight of 340, contained 87.0% aromatics, 13% saturates, analyzed 86.4% carbon, 10.7% hydrogen, and averaged 2.7 aromatic rings per aromatic molecule.

Extract No. 44 was obtained in the production of 200 Vis neutral, has an average molecular weight of 340 and contained 87% aromatics and 13% saturates.

Extract No. 45 was obtained in the production of 160 Vis Bright Stock and contained 92% aromatics and 8% saturates.

The solvent extracts used as starting materials for this invention have the following general properties and characteristics:

Table V

| Characteristic: | Range of value |
|---|---|
| Gravity, ° API | 7.3–18.3 |
| Gravity, sp., 60/60° F. | 0.945–1.022 |
| Viscosity SUS @ 210° F. | 40–1500 |
| Viscosity index | −128–+39 |
| Pour point (Max.) ° F. | +35–+100 |
| Molecular weight average (above 300) | 320–750 |
| Boiling point (initial) ° F. | 300–1000 |
| Boiling point (end) ° F. | 400–1200 |
| Sulfur, percent wt. (total) | 0.5–4.5 |
| Sulfur compounds percent by vol. | 200–50 |
| Aromatic compounds, percent by vol. | 25–90 |
| Neutral aromatic hydrocarbons, percent by vol. | 40–51 |
| Av. number of rings/mean arom. mol. | 1.7–5.0 |

In characterizing the complex acids, separated by the process of this invention, the molecular weights, sulfur content and average number of aromatic rings per mean aromatic molecule are the selected criterion.

The complexity of the types of compounds present, as based on these analyses, is illustrated by the following table:

Table VI.—Estimated chemical composition of solvent Extracts Nos. 19, 21, 43 and 44 of Table IV

| Type of compound: | Approx. percent by volume in the extract |
|---|---|
| Saturated hydrocarbons | 12.5 |
| Mononuclear aromatics: | |
|   Substituted benzenes | 25.0 |
| Dinuclear aromatics: | |
|   Substituted naphthalenes | 30.0 |
| Trinuclear aromatics: | |
|   Substituted phenanthrenes | 10.0 |
|   Substituted anthracenes | 5.0 |
| Tetranuclear aromatics: | |
|   Substituted chrysenes | 00.5 |
|   Substituted benzphenanthrenes | 0.2 |
|   Substituted pyrenes | 0.2 |
| Pentanuclear aromatics: | |
|   Perylene | 0.01 |
| Sulfur compounds,[1] oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the preparation of complex acid mixtures to be separated in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% by volume of polynuclear aromatics and heterocyclics of aromatic nature represent a preferred type of starting material for economic reasons.

The solvent extract starting material may be vacuum-distilled, dewaxed and/or clay-contacted and/or hydrogenated prior to use in preparing the complex carboxylic acids from which the acid mixtures separated in accordance with this invention are derived. Dewaxing can be accomplished by known methods, e.g., treatment with 45% MEK and 55% toluene as the dewaxing solvent, using temperatures in the order of −10° F., and solvent/solvent extract ratios of about 8/1. Using these conditions to dewax a lube distillate from a particular crude oil resulted in a dewaxed extract which has a pour point of +5° F. and results in the removal of about 2% wax having a melting point of about 130° F. Clay-contacting can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100–500 p.s.i.g., using temperatures of 530–600° F., in the presence of a molybdena-silica-alumina catalyst. This same method can be applied to the solvent extracts per se, that is, after their separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are ° API, 9.5; color, NPA, 7; flash (COC), 420° F.; fire (COC), 465° F.; pour point, −5° F.; vis @ 100° F., 1075 SUS; vis @ 210° F., 58.5 SUS: V.I., −96; neut. No. (1948), 0.05; sulfur, 2.60 wt. percent and C.R. percent, 0.01. The FCC recycle stock is illustrated by the 19% extract (phenol solvent) of FCC recycle stock, which extract had the following properties: ° API, 1.8; sulfur, 1.9 wt. percent; Br. No., 17; R.I. (20° C.), 1.6372 and Engler distillation, —IBP=589° F.; 90% —745° F. The use of these latter starting materials is described in copending application Serial No. 79,661.

The results of hydrogenation of several of the solvent extracts shown in Table III, to produce hydrogenated or dewaxed and hydrogenated solvent extracts for use in acid preparation are shown in Table VII:

b.p.s.d. of vacuum heavy gas oil from the vacuum tower (total 21,257 b.p.s.d.) is subjected to fluid catalytic cracking at about 900–880° F. using a standard cracking catalyst at a catalyst to oil ratio of about 8.4/1, space velocity of about 2.4 to produce 4,152 b.p.s.d. of light catalytic distillate, 7,516 b.p.s.d. of heavy gas oil recycle, 1,920 b.p.s.d. of decanted oil and 497 b.p.s.d. of net slurry recycle. The characteristics of the heavy cracked gas oil and decanted oil are shown in the following table:

*Table VIII.—Product characteristics*

|  | Heavy FCC recycle stock | | Decanted Oil | |
| --- | --- | --- | --- | --- |
|  | No. 1 | No. 2 | No. 1 | No. 2 |
| *Distillation—* | | | | |
| ASTM D-1160 at 10 mm.: | | | | |
| IBP, ° F | 151 | 173 | 177 | 198 |
| 5% | 299 | 305 | 351 | 346 |
| 50% | 368 | 369 | 455 | 449 |
| 95% | 429 | 433 | 644 | 645 |
| EP | 484 | 481 | 680 | 663 |
| ASTM D-1160 at 760 mm.: | | | | |
| IBP, ° F | 367 | 394 | 399 | 425 |
| 5% | 549 | 556 | 611 | 605 |
| 50% | 632 | 633 | 734 | 727 |
| 95% | 734 | 740 | 949 | 950 |
| EP | 767 | 767 | 989 | 970 |
| ASTM D-158 | | | | |
| IBP, ° F | 479 | 462 | | |
| 50% | 616 | 618 | | |
| EP | 712 | 712 | | |
| Viscosity, $C_s$ at— | | | | |
| 100° F | 6.16 | 6.16 | [1] 22.0 | [1] 22.7 |
| 130° F | 4.04 | 4.05 | 11.73 | 11.87 |
| 210° F | 1.88 | 1.89 | 3.74 | 3.76 |
| RI at 67° C | 1.4958 | 1.4965 | 1.5525 | 1.5520 |
| Pour point, ° F | +50 | +50 | +80 | +80 |
| Sulfur, wt. percent | 0.59 | 0.59 | 0.97 | 0.90 |
| Nitrogen, wt. percent | 0.02 | 0.02 | 0.03 | 0.03 |
| CR | 0.14 | 0.14 | 1.62 | 1.67 |
| Bromine No | 2.8 | 2.7 | 7.9 | 8.0 |
| Aniline point, ° F | 155.0 | 154.0 | 154.0 | 153.0 |
| °API | 26.2 | 25.7 | 14.8 | 14.6 |

[1] Extrapolated values.

NOTE.—The catalyst used in these experiments was a silica-alumina fluid cracking catalyst.

*Table VII.—Hydrogenation of solvent extracts and products*

| Reaction conditions | Run No. | | | | | | | | | Range of conditions and product properties |
| --- | --- | --- | --- | --- | --- | --- | --- | --- | --- | --- |
|  | 1 | 2 | 3 | 4 | 5 | 6 | 7 | 8 | 9 |  |
| Extract No | 43 | 44 | 44 | 44 | 41 | 43 | [1] 43 | 44 | [1] 44 |  |
| H/HC ratio | 2.0 | 2.0 | 2.5 | 2.5 | 1.75 | 1.03 | 2.0 | 2.0 | 2.02 | 1.0–2.5 |
| LVHSV | 2.15 | 2.05 | 2.0 | 1.95 | 2.0 | 2.0 | 2.0 | 1.97 | 2.0 | 1.9–2.5 |
| Temp., ° F | 700 | 700 | 650 | 650 | 650 | 675 | 700 | 700 | 720 | 650–720 |
| Pressure, p.s.i.g | 500 | 500 | 400 | 300 | 400 | 400 | 500 | 500 | 500 | 300–500 |
| Catalyst | | | | | | Filtrol | | | | |
| Products: | | | | | | | | | | |
| Neut. No | 0.13 | 0.14 | 0.52 | 0.96 | 0.11 | 0.66 | 0.24 | 0.08 | 0.15 | .08–1.0 |
| Sulfur (wt. percent) | 2.4 | 3.19 | 3.07 | 3.05 | 1.75 | 2.7 | 2.6 | 2.7 | 2.7 | 1.5–3.5 |
| Grav., ° API | 12.8 | 9.4 | 8.5 | 8.8 | 18.5 | 11.8 | 12.9 | 10.1 | 9.7 | 8.0–15.0 |
| Vis at 100° F | 663.7 | 1,133 | 1,457 | 1,452 | 132.5 | 808.7 | 851.1 | 464 | 1,058 | 450–1,000 |
| VI | −33 | −96 | −115 | −114 | −9 | −49 | −52 | −83 | −96 | −120–−9 |

[1] Dewaxed.

Table VII also sets forth the range of conditions and product properties that are generally applicable to preparing hydrogenated solvent extract starting materials from which acid mixtures are prepared by metalation, carbonation and acidification, which mixtures are separated by the process of this invention.

The preparation of FCC recycle stock and decant oil from such a process, which are illustrative materials to be metalated, carbonated and acidified to prepare complex acid mixtures treated in accordance with this invention, is illustrated in copending application Serial No. 242,076 (450). For example, in the treatment of 17,750 b.p.s.d. of fresh feed comprising distillates using a synthetic cracking catalyst at 900° F., 70% conversion at 1.5 through-put ratio (total charge divided by fresh feed) about 2,840 b.p.s.d. of $C_4$ hydrocarbons, 8,700 b.p.s.d. of $C_5$-400° gasoline, 4,438 b.p.s.d. of 400–600° light FCC cycle stock and 887 b.p.s.d. of decant oil is produced.

To illustrate, 17,004 b.p.s.d. of fresh feed and 4,253

The heavy cracked gas oil or heavy FCC cycle stock and decanted oil products above are illustrative of sources of complex high-molecular-weight polynuclear aromatic compounds to be used to prepare complex carboxylic acids which are separated by the process of this invention are derived. These feed sources can be treated in a manner to increase the aromaticity or extract the complex aromatic compounds therefrom, for use in the metalation reaction, i.e., by solvent extraction with the known solvents (described herein) for this purpose.

For the FCC recycle stock this is illustrated by the 19% extract (phenol solvent) thereof, which extract had the following properties: ° API, 1.8; sulfur, 1.9 wt. percent; Br. No., 17; R.I. (20° C.) 1.6372 and Engler distillation, —IBP=589° F.; 90%–745° F. The use of these latter starting materials is described in copending application Serial No. 79,661.

Without limiting the invention, the characteristics of the acid mixtures separated in accordance with this invention, are further disclosed as thus far evaluated. The mono-, di- and polycarboxylic acids are mixtures of acids of the dihydronaphthalene, dihydrophenanthrene, and dihydroanthracene types, having several alkyl groups and/or cycloalkyl groups in each aromatic nucleus wherein the sum of the carbon atoms in the alkyl or naphthenic radical substituents varies between 5 and 22. Despite the size of the acid molecules the linkages through or between the carboxyl groups are about the same as those of phthalic and terephthalic acids. Some of the aromatic rings or condensed aromatic rings are probably further condensed with naphthenic rings to form configurations similar to the steroid ring systems. Extract acids from solvent extracts obtained in the production of bright stocks probably contain more highly condensed aromatic structures.

Most of the sulfur is in the form of heterocyclic rings with carbon associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kurtz, King, Stout, Partikan and Skrabek (Anal. Chem., 28, 1928 (1956)). The extracts are soluble in ethyl ether, acetone, methyl ethyl ketone, tetrahydrofuran, benzene, toluene and xylene.

The acid mixtures derived from sulfur-containing aromatic compounds of petroleum origin treated in accordance with this invention are defined as those acid mixtures having molecular weights above about 300, containing 0.5 to 4.5% by weight of sulfur and having an average of about 1.7 to 5.0 aromatic rings per mean aromatic molecule. The acid mixtures are produced by metalation, carbonation and acidification. The process is applied to either the free acid mixture or the salts resulting from the carbonation step using the techniques outlined herein, the free acid mixture being converted to a salt mixture by reaction with a suitable compound of a Group I metal before addition of the Group II or other metal precipitant when free acids are the starting material.

The embodiments of this invention in which an exclusive property or privilege is claimed are defined as follows:

1. The process of fractionating complex mixtures of carboxylic acids derived from sulfur-containing aromatic compounds obtained by sequential metalation, carbonation and acidification of a petroleum fraction from the group consisting of solvent extracts obtained in the solvent refining of mineral lubricating oils with a solvent selective for aromatic compounds, such solvent extracts which have been hydrogenated, fluid catalytic cracked recycle stock and decant oil from a fluid catalytic cracking process which comprises transforming said acid mixture into an alkali metal salt in a solvent, adding a stoichiometric deficiency of a soluble salt of a heavy metal of the group consisting of Group II metals, lead, tin, iron, cobalt, nickel, germanium, chromium, and copper to form the heavy metal salt of a portion of said Group I metal salts, allowing the metathetically-formed portion of heavy metal salt to precipitate, separating said precipitated heavy metal salts from the filtrate containing a higher ratio of polycarboxylic to monocarboxylic acid salts in the solution than before addition of the heavy metal salt, acidifying said precipitated salts to form a first portion of free acids predominating in monocarboxylic acids, adding another stoichiometrically deficient portion of a heavy metal salt to said filtrate, separating and precipitating a second portion of said free acids predominating in dicarboxylic acids, and continuing said sequential addition of heavy metal salt, separation and acidification steps to obtain separate fractions of acids predominating in polycarboxylic acids until said filtrate is substantially free of the desired acids.

2. The process in accordance with claim 1 in which said complex carboxylic acids contain from 1 to 7 carboxyl groups per molecule and are characterized by having molecular weights of about 300 to 750, containing about 0.5 to 4.5 wt. percent of sulfur, and having an average of about 1.7 to 5.0 aromatic rings per mean aromatic molecule.

3. The process in accordance with claim 1 in which said complex mixture of carboxylic acids is derived from solvent extracts obtained in the solvent refining of mineral lubricating oil using a solvent selective for aromatic compounds.

4. The process in accordance with claim 1 in which said solvent is a member of the group consisting of water, low molecular weight alcohols and mixtures thereof.

5. The process in accordance with claim 1 in which the free acids are extracted after acidification of the precipitated salts by means of a solvent in which the free acids are soluble.

6. The process in accordance with claim 5 in which said solvent for extracting the free acid is of the group consisting of $C_1$ to $C_{12}$ alkanols, ethers and ketones.

7. The process in accordance with claim 3 in which the complex carboxylic acids have the following properties:

| Property: | Value |
| --- | --- |
| Av. mol wt. range | 325–470 |
| Melting point, °C. | 60–100 |
| Bromine number | 4–24 |
| Percent sulfur | 1.05–4.45 |
| Av. aromatic rings/mean aromatic molecule | 1.7–5.0 |
| —COOH/mole | 1.06–3.0 |

8. The process in accordance with claim 7 in which the solvent is water.

9. The process in accordance with claim 8 in which said first portion of free acids is characterized by an acid number of about 162, a molecular weight of about 405 and contains about 1.2 carboxyl groups per mole.

10. The process in accordance with claim 8 in which a subsequent portion of free acids is characterized by an acid number of about 307, a molecular weight of about 415 and contains about 2.27 carboxyl groups per mole.

11. The process in accordance with claim 8 in which soluble salt of a heavy metal is calcium acetate.

12. The process in accordance with claim 7 in which said precipitates are acidified and extracted with a solvent of the group consisting of $C_1$ to $C_{12}$ alkanols, ethers and ketones.

13. The process in accordance with claim 8 in which the soluble metal salt of a heavy metal is zinc chloride.

14. The process in accordance with claim 8 in which the soluble salt of a heavy metal is chromium chloride.

References Cited by the Examiner

UNITED STATES PATENTS

| 1,822,016 | 9/1931 | Daniels | 260—525 |
| 3,153,087 | 10/1964 | Kramer et al. | 260—327 |
| 3,180,876 | 4/1965 | Joo | 260—327 |

OTHER REFERENCES

Lochte et al.: "The Petroleum Acids and Bases," Chem. Pub. Co., New York (1955), pp. 20 and 68.

WALTER A. MODANCE, *Primary Examiner.*

JOHN D. RANDOLPH, *Examiner.*